US008272067B2

(12) United States Patent
Toebes et al.

(10) Patent No.: US 8,272,067 B2
(45) Date of Patent: Sep. 18, 2012

(54) PROTECTING COMMERCIALS WITHIN ENCODED VIDEO CONTENT

(75) Inventors: John Toebes, Cary, NC (US); Xiaorong Tai, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1330 days.

(21) Appl. No.: 11/945,434

(22) Filed: Nov. 27, 2007

(65) Prior Publication Data

US 2009/0135905 A1    May 28, 2009

(51) Int. Cl.
*G06F 21/00* (2006.01)
(52) U.S. Cl. ....... 726/32; 726/33; 380/217; 375/240.12; 375/240.01; 375/E7.076
(58) Field of Classification Search ........................ None
See application file for complete search history.

(56) References Cited

U.S. PATENT DOCUMENTS

| 7,055,166 | B1 | 5/2006 | Logan et al. | |
|---|---|---|---|---|
| 2003/0222994 | A1* | 12/2003 | Dawson | ........................ 348/247 |
| 2004/0025174 | A1 | 2/2004 | Cerrato | |
| 2006/0215984 | A1* | 9/2006 | Nesvadba et al. | ................ 386/46 |
| 2007/0236512 | A1* | 10/2007 | Huang et al. | ................... 345/634 |
| 2008/0101456 | A1* | 5/2008 | Ridge et al. | .............. 375/240.01 |

OTHER PUBLICATIONS

Wikipedia, "Video compression picture types", [online], Jun. 30, 2007 [retrieved on Oct. 3, 2007]. Retrieved from the Internet: <URL: http://en.wikipedia.org/w/index.php?title=Video_compression_picture_types&printable=yes>, pp. 1-3.
Wikipedia, "Reference frame (video)", [online], Aug. 19, 2007 [retrieved on Oct. 3, 2007]. Retrieved from the Internet: <URL: http://en.wikipedia.org/w/index.php?title=Reference_frame%28video%29&printable=yes>, pp. 1-2.
Wikipedia, "MPEG-4", [online], Sep. 18, 2007 [retrieved on Oct. 3, 2007]. Retrieved from the Internet: <URL: http://en.wikipedia.org/w/index.php?title=MPEG-4&printable=yes>, pp. 1-4.
Wikipedia, "MPEG-2", [online], Oct. 2, 2007 [retrieved on Oct. 3, 2007]. Retrieved from the Internet: <URL: http://en.wikipedia.org/w/index.php?title=MPEG-2&printable=yes>, pp. 1-8.
Wikipedia, "Macroblock", [online], Sep. 22, 2007 [retrieved on Oct. 3, 2007]. Retrieved from the Internet: <URL: http://en.wikipedia.org/w/index.php?title=Macroblock&printable=yes>, p. 1.

(Continued)

*Primary Examiner* — David Pearson
(74) *Attorney, Agent, or Firm* — Leon R. Turkevich

(57) ABSTRACT

In one embodiment, a method comprises identifying an identifiable video object from a video picture of a digital video having video content and commercial content, the video picture contained within the video content; encoding the identifiable video object as a video overlay object; encoding the commercial content based on generating a first key frame, and storing the video overlay object within the first key frame as an object that is not displayed as part of the commercial content; and encoding the video picture based on generating a second key frame that includes a default video object in place of the identifiable video object, the default video object including an overlay reference to the video overlay object within the first key frame, wherein unavailability of the video overlay object during rendering of the second key frame causes display of the default video object to visually corrupt the video picture.

17 Claims, 5 Drawing Sheets

OTHER PUBLICATIONS

Wikipedia, "Key frame", [online], Jul. 24, 2007 [retrieved on Oct. 3, 2007]. Retrieved from the Internet: <URL: http://en.wikipedia.org/w/index.php?title=Key_frame&printable=yes>, pp. 1-4.
Wikipedia, "Digital rights management", [online], Sep. 18, 2007 [retrieved on Sep. 18, 2007]. Retrieved from the Internet: <URL: http://en.wikipedia.org/w/index.php?title=Digital_rights_management&printable=yes>, pp. 1-13.
Wikipedia, "Analog hole", [online], Oct. 2, 2007 [retrieved on Oct. 3, 2007]. Retrieved from the Internet: <URL: http://en.wikipedia.org/w/index.php?title=Analog_hole&printable=yes>, pp. 1-4.

* cited by examiner

PROTECTING COMMERCIALS WITHIN ENCODED VIDEO CONTENT

TECHNICAL FIELD

The present disclosure generally relates to protection of digital video content, more particularly to protection of digital video content from unauthorized modification.

BACKGROUND

Digital Rights Management (DRM) provide protection of digital media content, based on requiring a user to provide a license key, assigned to the digital media content, before the user can view the digital media content. The license key may be embedded on a tangible medium such as a compact disc; the license key also may be supplied by an online vendor (e.g., a movie rental service) that allows the user to download the rental movie to a local personal computer for viewing, where the license key expires 24 hours after the first use, or 30 days after acquisition if not used; the license key also may be renewed based on the user purchasing a monthly subscription service with the online vendor.

Digital Video Discs (DVDs) can have encrypted video content that require a specialized player for viewing a movie encoded on the DVD: user interface controls (e.g., fast forward, Skip, etc.) of the DVD player can be disabled until the user finishes watching the commercials preceding the movie. Example forms of encryption include DIVX format and encryption from Cinea, a subsidiary of Dolby laboratories. Broadcast media companies also can offer online viewing of television shows/video programs with commercials that require a custom media player, requiring a user to watch the commercials.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

OVERVIEW

Figure 1:
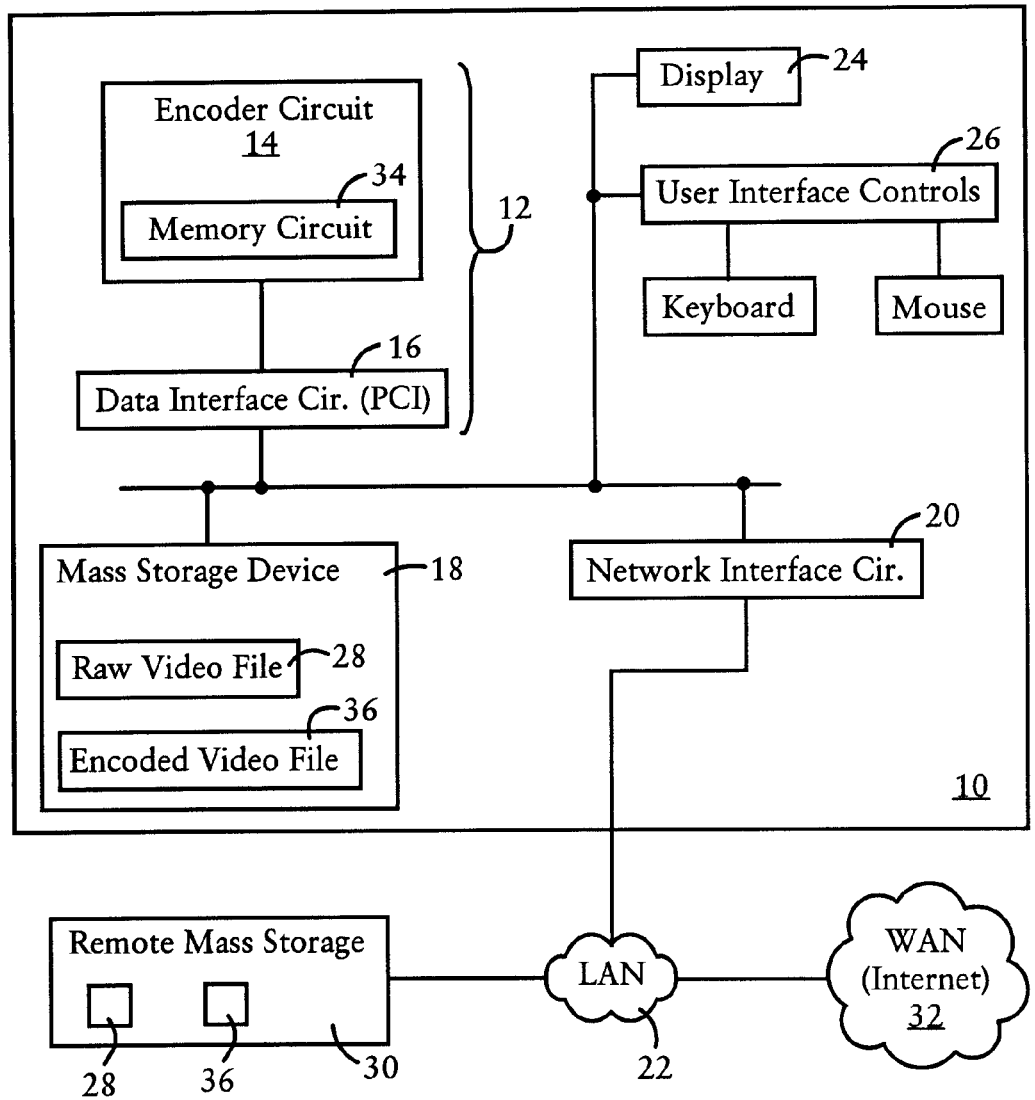
FIG. 1 illustrates an example system having an apparatus configured for generating an encoded video stream having protected commercials according to an example embodiment.

In one embodiment, a method comprises identifying, by an apparatus, an identifiable video object from a video picture of a digital video having video content and commercial content, the video picture contained within the video content; encoding by the apparatus the identifiable video object as a video overlay object; encoding by the apparatus the commercial content based on generating a first key frame, and storing the video overlay object within the first key frame as an object that is not displayed as part of the commercial content; and encoding by the apparatus the video picture based on generating a second key frame that includes a default video object in place of the identifiable video object, the default video object including an overlay reference to the video overlay object within the first key frame, wherein unavailability of the video overlay object during rendering of the second key frame causes display of the default video object to visually corrupt the video picture.

In another embodiment, an apparatus comprises an encoder circuit. The encoder circuit is configured for identifying an identifiable video object from a video picture of a digital video having video content and commercial content, the video picture contained within the video content. The encoder circuit further is configured for encoding the identifiable video object as a video overlay object. The encoder circuit further is configured for encoding the commercial content based on generating a first key frame, and storing the video overlay object within the first key frame as an object that is not displayed as part of the commercial content. The encoder circuit further is configured for encoding the video picture based on generating a second key frame that includes a default video object in place of the identifiable video object, the default video object including an overlay reference to the video overlay object within the first key frame, wherein unavailability of the video overlay object during rendering of the second key frame causes display of the default video object to visually corrupt the video picture.

DETAILED DESCRIPTION

Particular embodiments enable an encoder circuit, for example an MPEG-4 encoder circuit or a DIVX 6 encoder circuit, to protect commercials within digital video that includes both video content and commercial content. The encoder circuit can be used to identify an identifiable video object from a picture within the video content of the digital video, where the identifiable video object can be a composite object that is required to visually complete the picture. The encoder circuit can encode the identifiable video object from the picture as a video overlay object (e.g., a key object), and add the video overlay object within a first key frame that represents at least a portion of the commercial within the digital video. The encoder circuit can encode the picture that originally contained the identifiable video object based on generating a second key frame that includes a default video object in place of the identifiable video object, where the default video object includes an overlay reference to the video overlay object embedded within the first key frame of the commercial. Hence, a media player can successfully reconstruct the original picture during rendering of the second key frame, based on successfully retrieving the video overlay object available within the first key frame. Hence, an encoded video stream can be generated and stored by the encoder circuit that contains the first key frame for the commercial and the second key frame for the video content.

If, however, a user having obtained the encoded video stream (e.g., via the Internet or a peer to peer distribution network) attempts to modify the encoded video stream by removing the commercials within the video stream and generating a modified video stream that does not include the commercials, the removal of the commercials from the encoded video stream also will result in the removal of the video overlay object referenced by the second key frame. Consequently, the rendering of the modified video stream by a media player will result in display of background data from the default video object to visually corrupt the video picture, because the unavailability of the video overlay object prevents the media player from overlaying (i.e., overlying) the background data of the default video object with the identifiable video object.

Hence, commercial content within digital video can be protected based on embedding a key object from a key frame of video content within the commercial, and encoding the video picture using a second key frame that includes a default video object in place of the video overlay object and that references the video overlay object, in order to require the availability of the first key frame for the commercial in order to view the video picture without visual corruption. The visual corruption introduced by the default video object can be displayed for a prescribed time interval or for a prescribed number of frames, depending on the number of key frames within the video content that refer back to the video overlay object within the first key frame of the commercial content. In addition, background data in the default video object can be implemented to contain only uncoded data and no image data, resulting in the display of noise or "snow" in place of the identifiable video object; alternately, the default video object can be implemented to contain color information that is substantially distinct from the colors within the identifiable video object, resulting in the display of a grossly color-distorted image (e.g., a green or purple face instead of a flesh tone face). Hence, the visual corruption of the video picture can serve as a disincentive for further distribution of the modified video stream.

In addition, the background of the default video object can include an advertisement message associated with the commercial content encoded within the first key frame, resulting in corruption of the video picture in the form of a displayed advertisement message. Consequently, the modified video stream still can provide advertisement information despite the deletion of the commercial content from the original encoded video stream. Hence, the original encoded video stream can be freely distributed by a wide area networks or peer-to-peer networks without restriction, since commercials within the encoded video content cannot be removed without visually corrupting the video pictures, and because the visual corruption still can provide advertising value for users that are willing to tolerate use of the modified video stream.

FIG. 1 is a diagram illustrating an example system 10 having an encoder apparatus 12 configured for generating, from digital video 28, an encoded video stream 36 having protected commercials, according to an example embodiment. The example system 10 can be implemented, for example, as a personal computer, a computer workstation, or a laptop, etc. The example system 10 can include the encoder apparatus 12, a mass storage device (e.g., an internal or external hard drive) 18, a network interface circuit (e.g., wired or wireless local area network interface circuit) 20 for connecting to a local area network 22, a computer display 24, and user interface controls 26 that can include a keyboard and a pointing device such as a mouse.

The encoder apparatus 12 includes an encoder circuit 14 and a data interface circuit 16, for example a Peripheral Component Interconnect (PCI) bus interface or other high-speed data bus interface. The data interface circuit 16 can be configured for retrieving at least a portion of a digital video file 28 stored on a tangible computer readable medium, for example the mass storage device 18 or a remote mass storage device 30. The data interface circuit 16 also can be configured for outputting an encoded video stream 36, generated by the encoder 14, to a destination tangible storage medium 18 or 30 for storage of the encoded video stream 36 prior to distribution via a wide area network 32. The data interface circuit 16 also can be configured for receiving user inputs from the user interface controls 26, and outputting display data to the display 24, for example based on rendering of video data by a media player either internal or external to the encoder 14. As illustrated in FIG. 1, the encoder circuit 14 can include an internal memory circuit 34 for storage of application state variables, retrieved data, and encoded data generated during execution of encoding operations by the encoder 14, described below.

Any of the disclosed circuits of the encoder apparatus 12 (including the encoder circuit 14 in the data interface circuit 16 and their associated components) can be implemented in multiple forms. Example implementations of the disclosed circuits 14, 16 include hardware logic that is implemented in a logic array such as a programmable logic array (PLA), a field programmable gate array (FPGA), or by mask programming of integrated circuits such as an application-specific integrated circuit (ASIC). Any of these circuits 14, 16 also can be implemented using a software-based executable resource that is executed by a corresponding internal processor circuit such as a microprocessor circuit (not shown), where execution of executable code stored in an internal memory circuit (e.g., within the memory circuit 34) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 34 can be implemented, for example, using a non-volatile memory such as a programmable read only memory (PROM) or an EPROM, and/or a volatile memory such as a DRAM, etc.

Further, any reference to "outputting data" can be implemented based on creating the data in the form of a data structure and storing that data structure in a tangible memory medium in the disclosed apparatus (e.g., the memory circuit 34, the mass storage device 18, or the network interface circuit 20). Any reference to "outputting data" also can include electrically transmitting (e.g., via wired electric current or wireless electric field, as appropriate) the data stored in the tangible memory medium to another network node via a communications medium (e.g., a wired or wireless link, as appropriate) (optical transmission also can be used, as appropriate). Similarly, any reference to "receiving data" or can be implemented based on the disclosed apparatus detecting the electrical (or optical) transmission of the data on the communications medium, and storing the detected transmission as a data structure in a tangible memory medium in the disclosed apparatus (e.g., the memory circuit 34, the mass storage device 18, or the network interface circuit 20).

Also note that the memory circuit 34 can be implemented dynamically by the encoder circuit 14, for example based on memory address assignment and partitioning executed by the encoder circuit 14.

Figure 2:
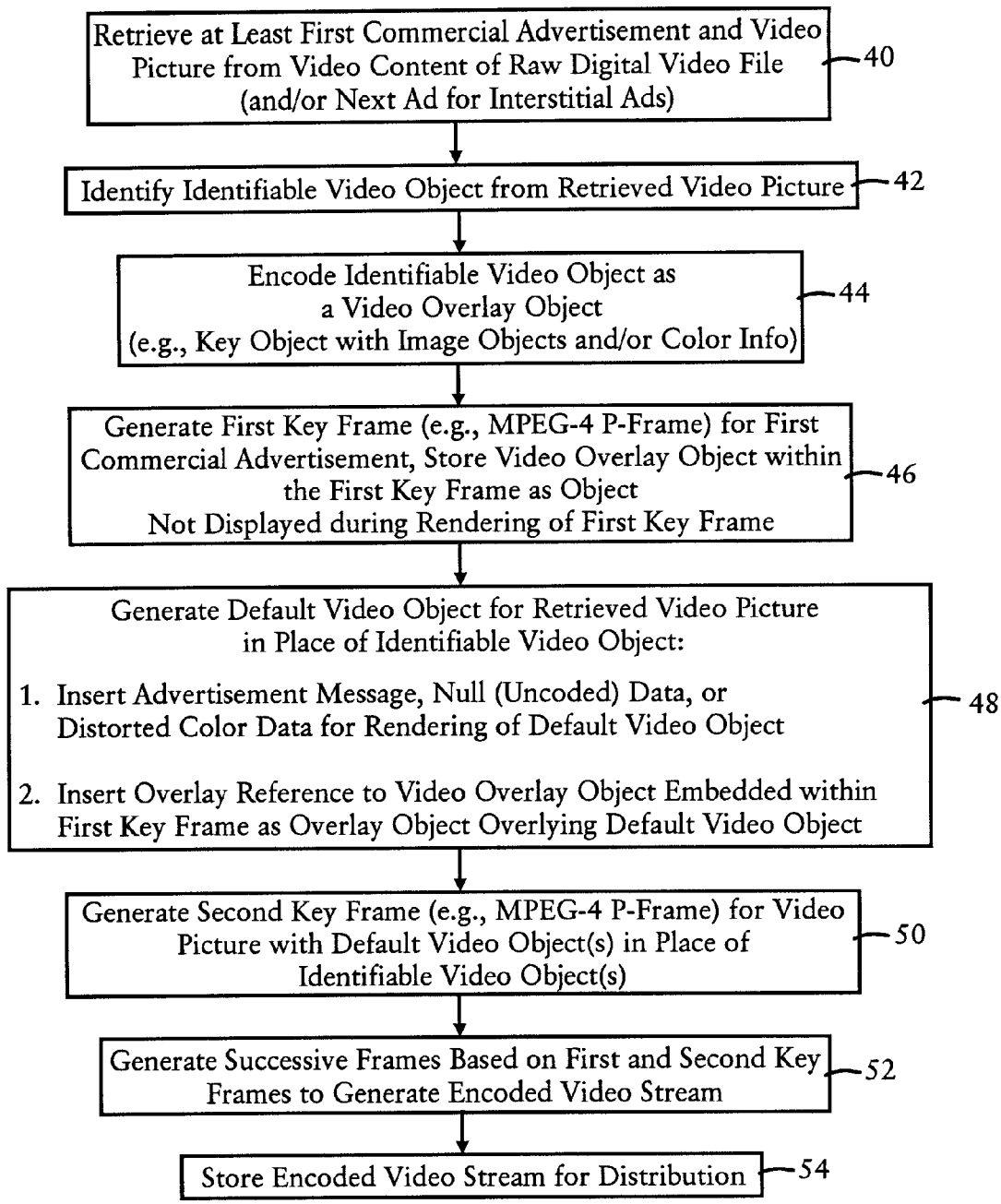
FIG. 2 illustrates an example method by the apparatus of FIG. 1 for generating the encoded video stream, according to an example embodiment.

FIG. 2 illustrates an example method by the encoder apparatus 12 for generating an encoded video stream 36 having protected commercials, according to an example embodiment. The steps described in FIG. 2 can be implemented as executable code stored on a computer readable medium (e.g., floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The encoder circuit (e.g., an MPEG-4 or DIVX 6 encoder circuit) 14 retrieves in step 40 at least a portion of the digital video 28 stored in the mass storage device 18 or 30. The digital video 28, at least a portion thereof illustrated in FIG. 3, can be implemented as "raw" digital video data, for example a raw video stream of more than one billion bits per second, where the video data can be represented by individual digital pixels or macroblocks that represent a group of pixels and having associated luminance (Y) and chroma (Cb, Cr) values. Alternately, the digital video 28 can be an MPEG-2 or MPEG-4 encoded video that is "decompressed" based on rendering the encoded video, and reencoding the video as described herein.

Figure 3:
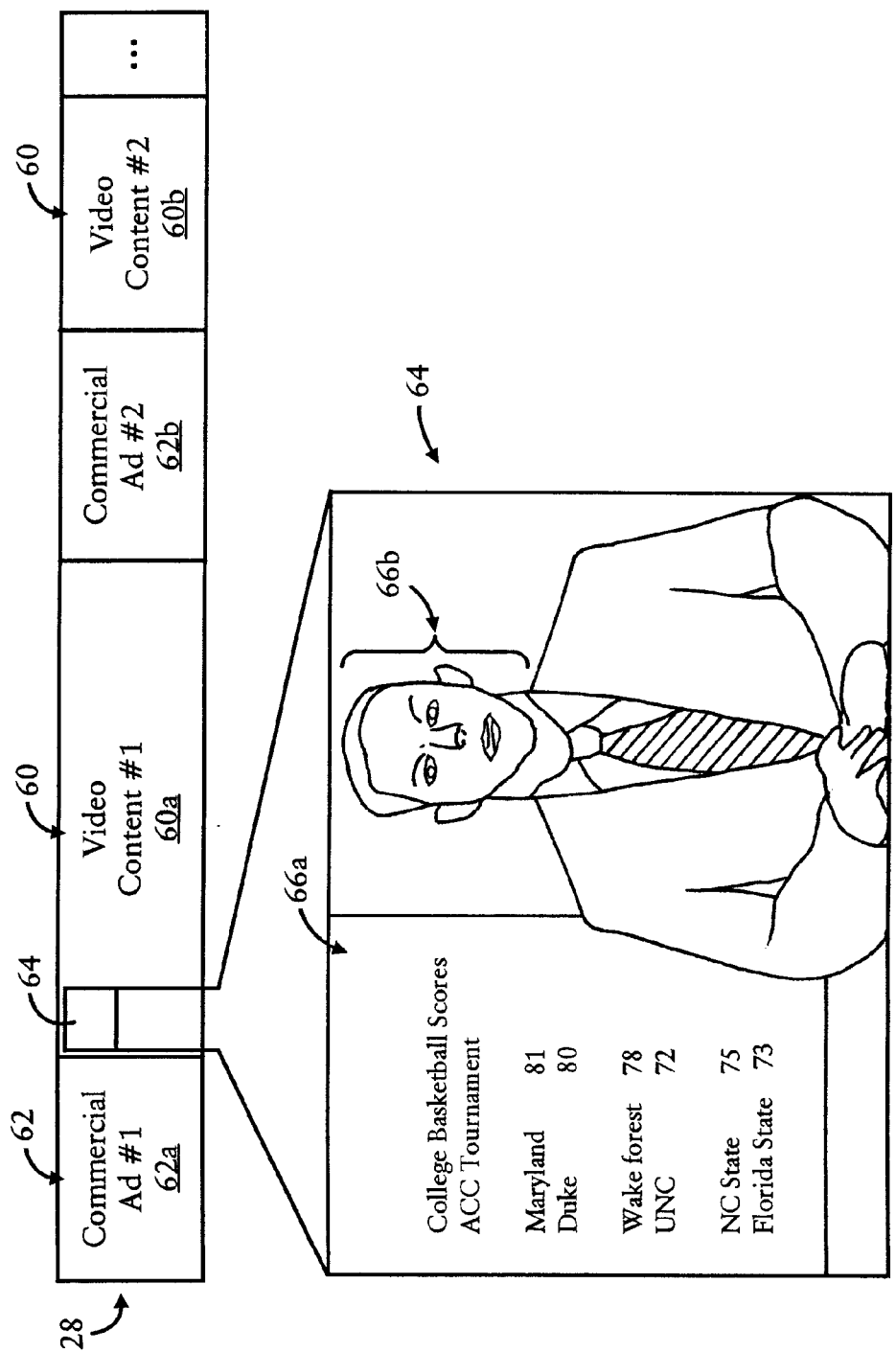
FIG. 3 illustrates an example digital video having video content and commercial content, prior to protective encoding by the apparatus of FIG. 1.

As illustrated in FIG. 3, the digital video 28 includes video content 60 and commercial content 62. As will be apparent, the positioning of the commercial content 62 relative to the video content 60 can either be "pre-roll" (i.e., commercial content 62 before the video content 60), "post-roll" (i.e., commercial content 62 following the video content 60), or interstitial (i.e., video content 60 interspersed with commercial content 62). As illustrated in FIG. 3, the digital video 28 includes the interstitial arrangement of the commercial content 62a followed by the video content 60a, followed by the commercial content 62b, followed by the video content 60b. As will become apparent, the actual positioning of the commercial content 62 relative to the video content 60 is immaterial.

FIG. 3 illustrates that the first video content 60a includes a video picture 64: the term "video picture" as used herein can refer to a single frame of image data (e.g., a single frame of an encoded pixel data or a single MPEG-encoded I-frame), or to the successive top and bottom fields of interlaced video. The encoding circuit 14 can identify in step 42 identifiable video objects 66 (e.g., 66a and 66b) from the retrieved video picture 64, for example according to prescribed encoding techniques, image and motion analysis executed by the encoder circuit 14, or based on manual selection input by a user of the system 10. In particular, the video object 66a can be a display of information of interest to a viewer of the digital video file 28, illustrated for example as college basketball scores during a sporting broadcast, webcast (e.g., a YouTube video, etc.). Another video object 66b can be the facial image of a sports announcer or commentator reporting on the information displayed in the video object 66a. As will be appreciated, different types of video objects can be identified from any digital video file 28 depending on the content and the focus of interest (i.e., focus of attention) by a viewer of the content being displayed.

Figure 4:
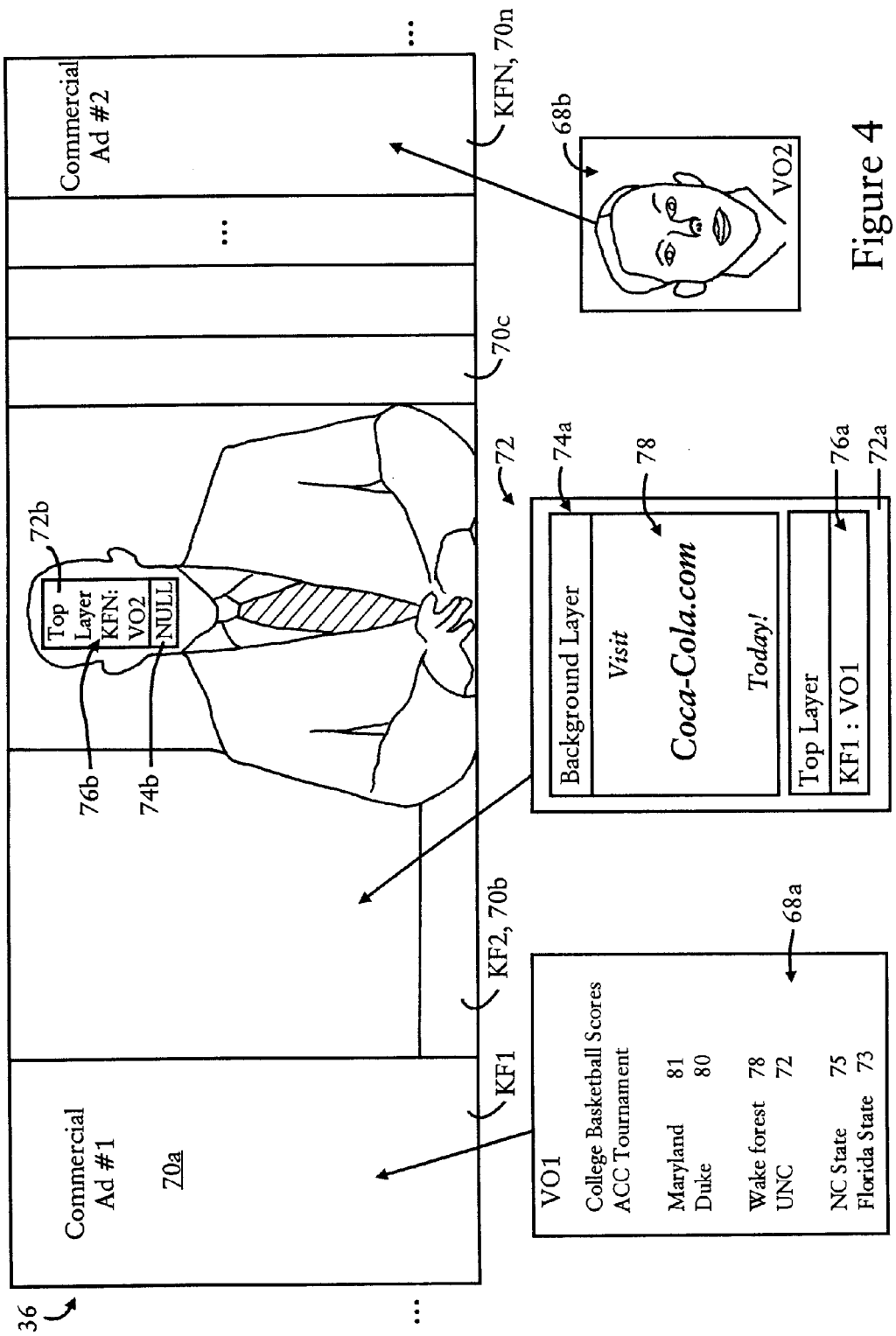
FIG. 4 illustrates example encoding of video overlay objects from a video picture into commercial content key frames, and encoding video pictures into second key frames referencing the video overlay objects within the commercial content key frames, according to an example embodiment.

The encoder circuit 14, in response to identifying the video objects 66a and 66b from the retrieved video picture 64, can encode in step 44 of FIG. 2 the identified video objects 66a and 66b into respective video overlay objects 68a and 68b, illustrated in FIG. 4. Each of the video overlay objects 68a and 68b can be implemented as key objects within an object-oriented composite file system that utilizes three-dimensional rendering, for example according to MPEG-4 encoding. Hence, the key objects 68a and 68b can represent compressed video data for the respective video objects 66a and 66b illustrated in FIG. 3. Further, use of a three-dimensional rendering of an object-oriented composite file system enables the key objects 68a and 68b to be stored at locations that are distinct from the key frame that is used to render the remaining portions of the retrieved video picture 64. The key objects 68a and/or 68b also can include color information (e.g., Cb, Cr values) for rendering the respective identified video objects 66a and 66b: for example, the key object 68b can specify color information for providing the appropriate skin tone colors for the facial image of the sports commentator.

The encoder circuit 14 can generate key frames 70 (e.g., 70a, 70b, 70c, . . . 70n) for various video pictures 64 within the digital video 28. For example, the encoder circuit 14 can generate in step 46 a key frame 70a for the first commercial advertisement 62a. Use of the term "key frame" refers to a frame of compressed video that is used to define past or future images, for example in the form of an MPEG 4 encoded P-frame. For example, a key frame can be set to identify a beginning or end of a variation in a video object (e.g., movement of an object across a display), or changes in audio. Since key frames are not prohibited from including embedded objects that are referenced by other frames, the video overlay object 68a for the identified video object 66a can be stored by the encoder circuit 14 into the first key frame 70a as an object that is not displayed during rendering of the key frame 70a. In other words, since a video file 36 can include multiple data streams (e.g., audio stream, video stream) simultaneously encoded as packets in sequence, the video overlay object 68a can be stored within a data stream associated with the commercial component 70a of the video. Note that there is no requirement that an object (e.g., 68a) encoded in a stream (e.g., associated with the commercial component 70a) is referenced at all. Hence, a media player that renders the key frame 70a for presentation of the commercial advertisement 62a will not display the video overlay object 68a during presentation of that commercial advertisement 62a.

As illustrated in FIG. 4, a video overlay object 68b for the identified video object 66b of the video picture 64 also can be added by the encoder circuit 14 to a key frame 70n that is rendered subsequent to the presentation of the video picture 64.

The encoder circuit 14 initiates generation of the second key frame 70b for the retrieved video picture 64 by first generating a default video object 72 for each video overlay object 68 that is stored in a different key frame. For example, the encoder circuit 14 can generate in step 48 a default video object 72a for the video overlay object 68a stored within the commercial key frame 70a, and a default video object 72b for the video overlay object 68b stored within the commercial key frame 70n.

The encoder circuit 14 can insert into each default video object 72 a corresponding background layer 74 (e.g., 74a, 74b), and an overlay reference 76. Each background layer 74 can include information identifying data that should be displayed to visually corrupt the video picture if the corresponding video overlay object 68 is not available. For example, if during rendering by a media player the video overlay object 68a is not available during rendering of the default video object 72a because the key frame 70a has been removed by a malicious user having received a copy of the original encoded video file 36, the default video object 72 will be displayed as the background layer. Hence, the background layer 74a can include an advertisement message 78 that is displayed in a corrupted video picture 80 (FIG. 5) if the corresponding video overlay object 68a is not available because the commercial key frame 70a has been removed. Alternatively, the background layer 74b of the default video object 72b can include null, uncoded data that has no image data, resulting in corrupting of the video picture 80 with a "noise image" 82 based on a determined unavailability of the corresponding video overlay object 68*b* due to the removal of the commercial key frame 70*n*.

The overlay reference 76 in each default video object 72 can reference the corresponding video overlay object 68 stored in another key frame 70. Hence, the encoder circuit 14 in step 48 inserts into the default video object 72*a* an overlay reference 76*a* that references the corresponding video overlay object 68*a* by specifying the key frame 70*a* that stores the video overlay object 68*a*, and specifying a unique identifier ("VO1") for the video overlay object 68*a*; the encoder circuit 14 inserts into the default video object 72*b* an overlay reference 76*b* that references the corresponding video overlay object 68*b* by specifying the key frame 70*n* that stores the video overlay object 68*b*, and specifying a unique identifier ("VO2") for the video overlay object 68*b*. The encoder circuit 14 completes generation of the key frame 70*b* for the video picture 64 of FIG. 3 by inserting the default video objects 72*a* and 72*b* in place of the respective video overlay objects 68*a* and 68*b* that rendered the identifiable video objects 66*a* and 66*b*.

Figure 5:
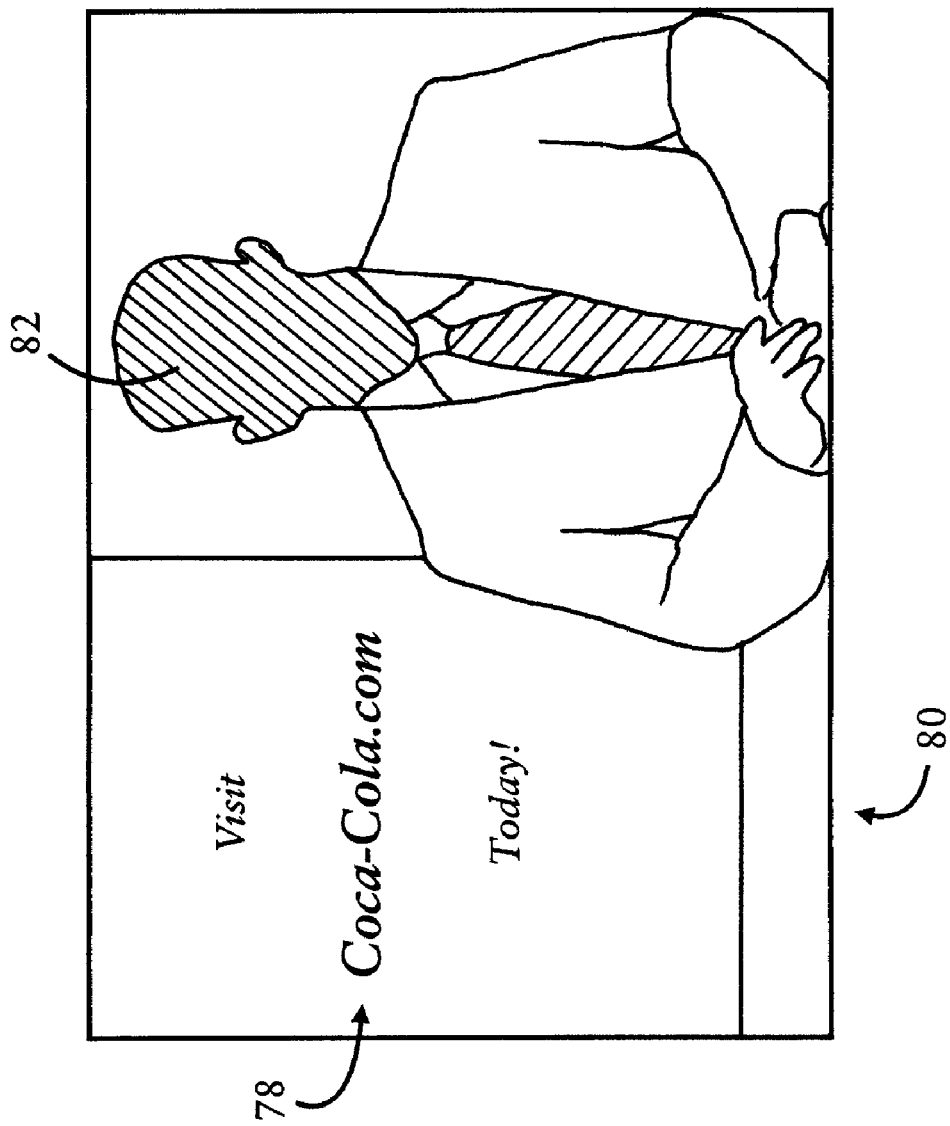
FIG. 5 illustrates an example video picture that is visually corrupted based on display of a default video object due to the unavailability of the video overlay object within the commercial content key frame, according to an example embodiment.

Hence, the key frame 70*b* includes the default video objects 72*a* and 72*b* that include the respective background layers 74*a* and 74*b* that are displayed to visually corrupt the video picture 80 of FIG. 5 if the respective video overlay objects 68*a* and 68*b* are not available during rendering of the key frame 70*b*. If a media player determines during rendering of the key frame 70*b* that the video overlay objects 68*a* and 68*b* referenced by the respective overlay references 76*a* and 76*b* are available, the media player can retrieve the respective video overlay objects 68*a* and 68*b*, and display the respective video overlay objects 68*a* and 68*b* overlying the respective background layers 74*a* and 74*b*, resulting in reproduction of the original video picture 64.

The encoder circuit 14 can generate successive frames (e.g., other P-frames or B-frames) based on the key frames (e.g., 70*a*, 70*b*, 70*c*, 70*n*, etc.), in order to generate in step 52 the completed encoded video stream 36 having the protected commercials based on an embedding the video overlay objects from the video pictures 64. The completed encoded video stream 36 can be stored in step 54 to a mass storage device 18 or 30 for unrestricted worldwide distribution, for example using viral marketing techniques, peer-to-peer distribution, etc.

According to example embodiments, commercial advertisements can be protected within a digital video based on embedding video objects from video content within the digital video into key frames used to render the commercial advertisements. Hence, conventional media players can play both the encoded video streams having the protected commercial advertisements, as well as modified video streams that lack the protected commercial advertisements: in the latter case, however, rendering of the modified video streams can result in visual corruption of the video picture that may cause a user to lose interest in the video content, limiting the dissemination of the modified video streams based on reduced interest; further, the visual corruption of the video picture still can be useful for users that still maintaining an interest in the corrupted video picture, since the corrupted video picture also can include its own advertisement that mitigates the removal of the original commercial advertisement.

As apparent from the foregoing, the corruption of a video picture can be temporary, for example for a duration corresponding to the time interval of the original commercial advertisement that was deleted; hence, a digital video having corrupted video pictures still may be beneficial, since advertisers still can obtain reasonably adequate exposure based on display of an advertisement message within the corrupted video picture.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
identifying, by an apparatus, an identifiable video object from a video picture of a digital video having video content and commercial content, the video picture contained within the video content;
encoding by the apparatus the identifiable video object as a video overlay object;
encoding by the apparatus the commercial content based on generating a first key frame containing the commercial content, and storing the video overlay object within the first key frame as an object that is not displayed as part of the commercial content; and
encoding by the apparatus the video picture based on generating a second key frame that includes a default video object in place of the identifiable video object, the default video object including an overlay reference to the video overlay object within the first key frame, wherein the commercial content is protected based on an unavailability of the first key frame containing the video overlay object, during rendering of the second key frame, causing display of the default video object to visually corrupt the video picture.

2. The method of claim 1, wherein availability of the video overlay object, during rendering of the second key frame, causes the video picture to be displayed with the identifiable video object based on the overlay reference causing display of the video overlay object overlying the default video object.

3. The method of claim 2, wherein the encoding of the video picture includes inserting, as the default video object, an advertisement message associated with the commercial content, the advertisement message displayed based on the unavailability of the video overlay object during rendering of the second key frame.

4. The method of claim 2, wherein the default video object contains uncoded data and no image data.

5. The method of claim 2, wherein the video overlay object includes first color information for rendering the identifiable video object according to respective colors within the identifiable video object, and the default video object includes second color information for rendering the identifiable video object according second colors substantially distinct from the colors within the identifiable video object.

6. The method of claim 2, wherein the first key frame is a first predictive-coded frame (P-frame), and the second key frame is a second P-frame.

7. The method of claim 6, wherein the first P-frame and the second P-frame each are encoded according to MPEG-4 encoding.

8. The method of claim 1, further comprising storing an encoded video stream, containing the first key frame and the second key frame, on a tangible storage medium for distribution via a wide area network.

9. An apparatus comprising:
an encoder circuit configured for identifying an identifiable video object from a video picture of a digital video having video content and commercial content, the video picture contained within the video content;

the encoder circuit further configured for encoding the identifiable video object as a video overlay object;

the encoder circuit further configured for encoding the commercial content based on generating a first key frame containing the commercial content, and storing the video overlay object within the first key frame as an object that is not displayed as part of the commercial content; and the encoder circuit further configured for encoding the video picture based on generating a second key frame that includes a default video object in place of the identifiable video object, the default video object including an overlay reference to the video overlay object within the first key frame, wherein the commercial content is protected based on an unavailability of the first key frame containing the video overlay object, during rendering of the second key frame, causing display of the default video object to visually corrupt the video picture;

the encoder circuit including a memory circuit configured for storing data associated with encoding any one of the identifiable video object, the commercial content, or the video picture.

10. The apparatus of claim 9, wherein availability of the video overlay object, during rendering of the second key frame, causes the video picture to be displayed with the identifiable video object based on the overlay reference causing display of the video overlay object overlying the default video object.

11. The apparatus of claim 10, wherein the encoder circuit is configured for inserting, during encoding of the video picture, an advertisement message associated with the commercial content as the default video object, the advertisement message displayed based on the unavailability of the video overlay object during rendering of the second key frame.

12. The apparatus of claim 10, wherein the default video object contains uncoded data and no image data.

13. The apparatus of claim 10, wherein the video overlay object includes first color information for rendering the identifiable video object according to respective colors within the identifiable video object, and the default video object includes second color information for rendering the identifiable video object according second colors substantially distinct from the colors within the identifiable video object.

14. The apparatus of claim 10, wherein the first key frame is a first predictive-coded frame (P-frame), and the second key frame is a second P-frame.

15. The apparatus of claim 14, wherein the first P-frame and the second P-frame each are encoded by the encoder circuit according to MPEG-4 encoding.

16. The apparatus of claim 9, wherein the encoder circuit is configured for storing an encoded video stream, containing the first key frame and the second key frame, on a tangible storage medium for distribution via a wide area network.

17. An apparatus comprising:

means for reading a digital video having video content containing a video picture and commercial content; and means for identifying an identifiable video object from the video picture, the means for identifying further configured for encoding the identifiable video object as a video overlay object;

the means for identifying further configured for encoding the commercial content based on generating a first key frame, and storing the video overlay object within the first key frame as an object that is not displayed as part of the commercial content;

the means for identifying further configured for encoding the video picture based on generating a second key frame that includes a default video object in place of the identifiable video object, the default video object including an overlay reference to the video overlay object within the first key frame, wherein unavailability of the video overlay object during rendering of the second key frame by a media player causes display of the default video object to visually corrupt the video picture.

* * * * *